Oct. 6, 1959    J. J. PRAG    2,907,483
OUTBOARD MOTOR SUPPORTS FOR AUTOMOBILES
Filed May 5, 1958
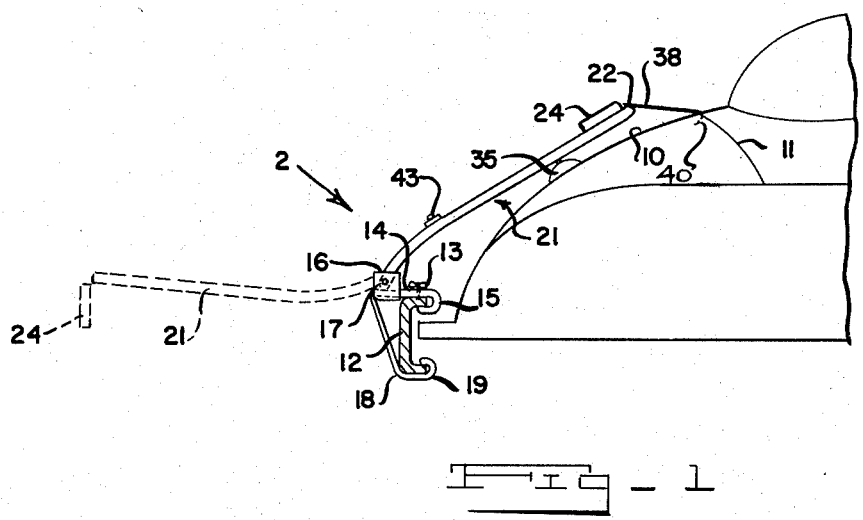
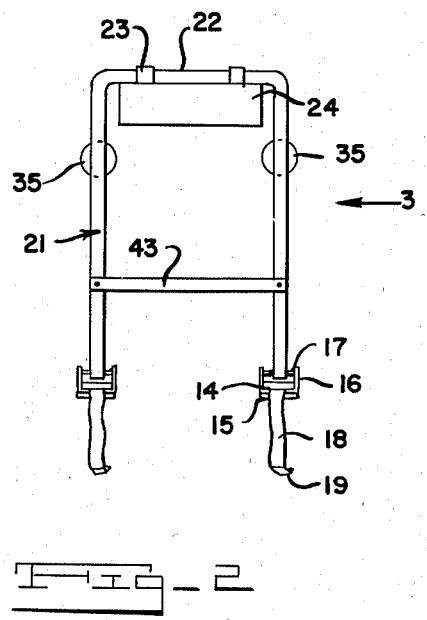
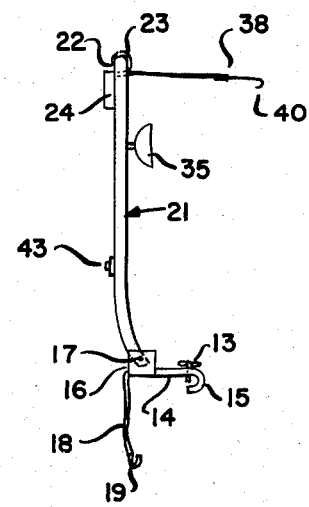
INVENTOR.
JEROME J. PRAG
BY
Cullen & Canton
ATTORNEYS

2,907,483

OUTBOARD MOTOR SUPPORTS FOR AUTOMOBILES

Jerome J. Prag, Detroit, Mich.

Application May 5, 1958, Serial No. 732,842

1 Claim. (Cl. 214—450)

This application relates to outboard motor supports for automobiles and discloses an improvement over the support shown in my prior, now abandoned, application, Serial No. 546,851 of November 15, 1955.

An object of my invention is to provide an outside support for an outboard motor, outside the trunk of the automobile.

Still further objects of my invention will best be understood upon reference to the appended drawings which disclose the support which I have invented.

In these drawings:

Fig. 1 is a side view of the rear part of an automobile showing my support.

Figs. 2 and 3 are rear and side views of the support.

The drawing shows an automobile having an upwardly opening trunk lid 10 with a forward edge 11 and having a rear bumper 12 to which are detachably secured by bolts 13 clamps 14 having hooked ends 15 and vertical flanges 16 which mount pivot pins 17. Adjustable straps 18 fastened to clamps 14 and having hooks 19 at their lower ends are provided for hooking around the lower edge of the bumper 12.

The support includes an inverted U-shaped frame 21 of steel tubing whose vertical members have their lower ends pierced to receive pivots 17 which thus pivotally mount the frame. To the bight 22 of the frame 21 is pivotally fastened by hooks 23 a board 24 sturdy enough and thick enough to enable it to be used for clamping thereto an outboard motor not shown, in about the same way that the outboard motor is clamped to a boat, that is, by means of motor clamps not shows.

Rubber suction cups 35 on the vertical members of the frame abut the trunk lid and thus stop forward movement of the frame.

Adjustable connecting means or straps 38 connected to the bight 22 are formed with hooks 40 which hook over the forward edge 11 of the trunk lid 10 and thus stop rearward movement of the frame.

Frame 21 has an additional lower reinforcing crossbar or brace 43, to which the lower end of the outboard motor may be tied by straps not shown.

The frame 21 with an outboard motor thereon is swingable on pivots 17 of the clamps at the lower end of the frame as a pivot rearwardly away from the trunk lid by detaching the hook connections at 40 between the straps 38 and the lid edge 11 and also by releasing the suction cups 35.

If it is desired to open the trunk lid, it is merely necessary to release the hooks 40 at the forward edge 11 of the trunk lid 10 and to release the suction cups 35 whereupon the frame may be swung rearwardly. The trunk lid 11 may now be opened without interference.

In addition, with the frame swung rearwardly, the lower end of the outboard motor rests on the ground in position to be removed from the board 24 and freed from the automobile. Thus, in removing the motor from the automobile, it is not necessary to lift the motor off a support but instead the frame is swung rearwardly to lower the motor to the ground.

If desired, the support with the motor thereon may be removed from the automobile as a unit or separately, and the motor with the support, may be positioned for storage on a wall of a garage or boathouse. This may be done merely by loosening bolts 13 which secure clamps 14 to the bumper and releasing hooks 19 and 40.

It will be observed that the construction disclosed provides a convenient arrangement for mounting an outboard motor on the outside of an automobile easily and safely, without interfering with the opening of the trunk lid whenever desired and in a manner to permit the motor to be removed from the support without requiring the motor to be lifted from the automobile or the support but merely to be lowered to the ground with the support as a unit.

Now having described the support herein disclosed reference should be had to the claim which follows:

I claim:

In an outboard motor support for releasable attachment to an automobile having a rear transverse bumper having a rear face and top and bottom lips and a trunk lid having a forward transverse edge; the combination of bumper mounting clamps extending longitudinally of the automobile and adapted to overlie the bumper and having their forward ends formed as hooks for hooking over the forward edge of the bumper top lip; the clamps having clamp screws for adjustably engaging the top lip of the bumper and thus releasably and adjustably clamping the clamps to the bumper; the clamps also having connected to their rear ends adjustable flexible straps for extending down across the bumper face and having their free ends formed as hooks for hooking under and around the forward edge of the bumper bottom lip; and an inverted U shape frame having vertical legs; and horizontal transverse pivot pins pivotally connecting the legs at their lower ends to the rear ends of clamps, said frame having a top bight, flexible straps connected to said bight and having free ends provided with hooks for hooking over the forward transverse edge of the trunk lid; the legs of the frame having suction cups secured thereto to prevent the legs from direct contact with the trunk lid and to adhere to the trunk lid.

References Cited in the file of this patent

UNITED STATES PATENTS

| | | |
|---|---|---|
| 2,204,824 | Rock | June 18, 1940 |
| 2,439,707 | Wright | Apr. 13, 1948 |
| 2,492,841 | Burkey | Dec. 27, 1949 |
| 2,573,187 | Desilets | Oct. 30, 1951 |
| 2,592,050 | McCharen | Apr. 8, 1952 |
| 2,663,474 | Kelly | Dec. 22, 1953 |
| 2,762,542 | Hodgeman | Sept. 11, 1956 |
| 2,779,524 | Carlson | Jan. 29, 1957 |
| 2,797,007 | McNeely | June 25, 1957 |